United States Patent
Kinch (10) Patent No.: US 10,941,856 B2
(45) Date of Patent: Mar. 9, 2021

(54) DUAL SUMP TRANSMISSION HYDRAULIC CONTROL SYSTEM

(71) Applicant: FORD GLOBAL TECHNOLOGIES, LLC, Dearborn, MI (US)

(72) Inventor: Derek Kinch, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1874 days.

(21) Appl. No.: 14/300,674

(22) Filed: Jun. 10, 2014

(65) Prior Publication Data

US 2015/0354697 A1    Dec. 10, 2015

(51) Int. Cl.
| | |
|---|---|
| *F01M 11/00* | (2006.01) |
| *G05D 23/02* | (2006.01) |
| *F16H 61/00* | (2006.01) |
| *F16K 31/00* | (2006.01) |
| *F16K 11/07* | (2006.01) |
| *F16H 57/04* | (2010.01) |
| *F16K 11/065* | (2006.01) |

(52) U.S. Cl.
CPC ....... *F16H 61/0025* (2013.01); *F16H 57/045* (2013.01); *F16H 57/0409* (2013.01); *F16H 57/0446* (2013.01); *F16H 57/0447* (2013.01); *F16H 57/0456* (2013.01); *F16K 11/065* (2013.01); *F16K 11/07* (2013.01); *F16K 31/002* (2013.01); *F01M 2011/0037* (2013.01); *F01M 2011/0045* (2013.01); *F16H 2061/0037* (2013.01); *G05D 23/02* (2013.01); *G05D 23/021* (2013.01); *G05D 23/022* (2013.01); *Y10T 74/20024* (2015.01); *Y10T 137/86879* (2015.04)

(58) Field of Classification Search
CPC .... G05D 23/02; G05D 23/021; G05D 23/022; F16H 61/0025; F16K 11/065; F01M 2011/0037; F01M 2011/0045
See application file for complete search history.

(56) References Cited

U.S. PATENT DOCUMENTS

| 3,770,076 A | * | 11/1973 | Ward ................... F15B 21/042 |
| | | | 123/41.1 |
| 3,927,830 A | * | 12/1975 | Briski ................... G05D 16/10 |
| | | | 123/41.12 |
| 4,967,621 A | * | 11/1990 | Soga ..................... B60W 30/18 |
| | | | 477/45 |

(Continued)

FOREIGN PATENT DOCUMENTS

| GB | 926644 A | * | 5/1963 | ............... F01M 9/06 |
| JP | 2006189120 A | | 7/2006 | |

*Primary Examiner* — Edward F Landrum
*Assistant Examiner* — Daniel C Comings
(74) *Attorney, Agent, or Firm* — Vincent Mastrogiacomo; Brooks Kushman P.C.

(57) ABSTRACT

A hydraulic control system includes a primary sump and an auxiliary sump. When the transmission fluid is warm, fluid remains in the auxiliary sump reducing the volume of oil in circulation throughout the transmission to reduce parasitic losses. An oil control valve is designed to block flow of oil from the auxiliary sump to the primary sump when the fluid is warm and to allow flow when the fluid is cold. The oil control valve also responds to transmission line pressure. At moderate temperatures, fluid is held in the auxiliary sump when the engine is running but drains back to the primary sump when the engine is off.

21 Claims, 7 Drawing Sheets

(56) References Cited

U.S. PATENT DOCUMENTS

| | | | | |
|---|---|---|---|---|
| 5,113,720 A | * | 5/1992 | Asayama | F16H 61/0206 |
| | | | | 477/154 |
| 5,516,042 A | * | 5/1996 | Gerstengerger | F15B 21/045 |
| | | | | 236/100 |
| 5,749,439 A | | 5/1998 | Van Maanen | |
| 2007/0194140 A1 | * | 8/2007 | Nestler | F25B 41/062 |
| | | | | 236/92 B |
| 2010/0037850 A1 | * | 2/2010 | Jessberger | F01M 5/002 |
| | | | | 123/198 E |
| 2010/0074767 A1 | * | 3/2010 | Nelson | F04B 49/03 |
| | | | | 417/292 |
| 2012/0055559 A1 | | 3/2012 | Pignard | |

\* cited by examiner

DUAL SUMP TRANSMISSION HYDRAULIC CONTROL SYSTEM

TECHNICAL FIELD

This disclosure relates to the field of automotive transmission hydraulic control systems. More particularly, the disclosure pertains to a hydraulic control system having an auxiliary sump.

BACKGROUND

Many automotive transmissions utilize pressurized lubrication. A pump draws fluid from a sump and forces the fluid through lubrication passageways in gearbox components. The lubrication passageways are carefully designed to ensure that fluid reaches all of the parts that require lubrication. The fluid is then discharged from the gearbox components by a combination of gravitational forces and centrifugal forces generated by rotating components. Eventually, the fluid flows back to the sump which is located at the lowest point in the transmission housing. A sufficient quantity of fluid must be present to ensure that the sump does not become empty. The quantity required is typically dictated by cold operating conditions because the fluid has much higher viscosity when cold and therefore takes longer to drain back to the sump.

If the fluid level in the sump is high, some of the rotating components of the gearbox may extend into the fluid. When that happens, the fluid resists the movement of the components. The engine must generate additional torque to overcome the additional parasitic drag, increasing fuel consumption. Furthermore, the churning that results when rotating components move through the fluid may result in small air bubbles forming in the oil. These air bubbles make the fluid less effective. Excessively high fluid level is most likely to occur at higher temperature because the fluid drains back to the sump quickly so a small fraction of the fluid is in transit.

SUMMARY OF THE DISCLOSURE

A transmission hydraulic control system includes a primary sump, an auxiliary sump, and an oil control valve. The oil control valve passively restricts flow from the auxiliary sump to the primary sump when the fluid temperature exceeds a threshold. The threshold varies depending upon whether the engine is running or not. Excess flow may be vented to the auxiliary sump. An engine driven pump draws fluid from the primary sump and pressurizes the fluid to a line pressure. The oil control valve may utilize line pressure as an indicator of whether or not the engine is running.

An oil control valve includes a housing and first and second sliding spools. The housing defines four ports, one connected to line pressure, one connected to the auxiliary sump, and one connected to the primary sump. A wax motor separates the two spools by a distance that depends upon the temperature of fluid in the fourth port. The position of the first spool is determined by the line pressure which biases the spool toward the second spool. When the line pressure is above a threshold, the first spool may move against a shoulder of the housing. The shoulder may be created by using a smaller diameter for the second spool than for the first spool. The second spool is biased by a spring. The second spool is configured to permit flow between the auxiliary sump and primary sump in certain positions and to block the flow in other positions.

BRIEF DESCRIPTION OF THE DRAWINGS

FIG. 3 is a cross sectional view of an oil control valve when fluid is colder and an engine is on.

FIG. 4 is a cross sectional view of an oil control valve when fluid is at moderate temperature and an engine is on.

FIG. 7 is a cross sectional view of an oil control valve when fluid is at normal operating temperature and an engine is on.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
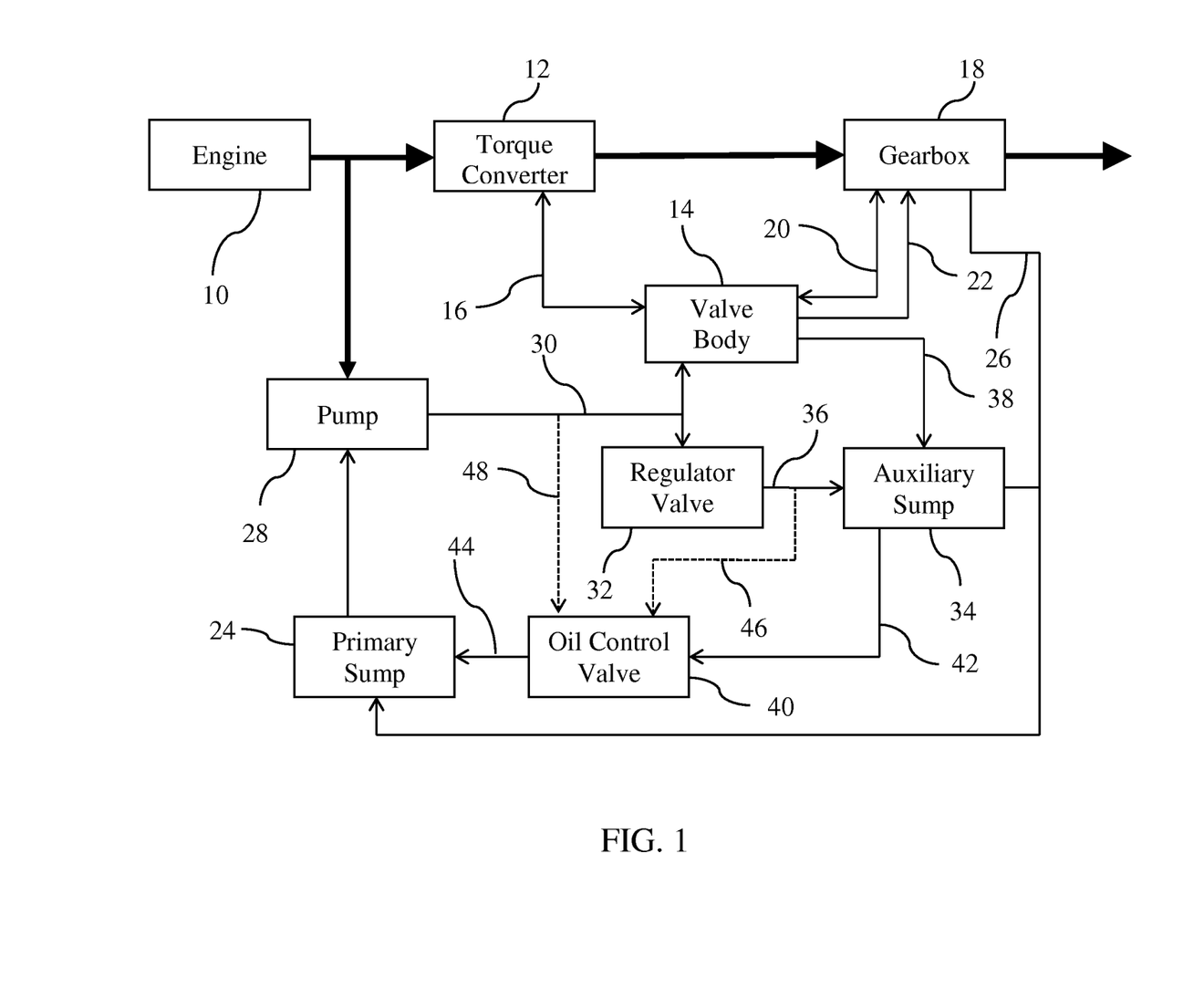
FIG. 1 is a schematic representation of transmission hydraulic network.

A transmission hydraulic control system is illustrated schematically in FIG. 1. Bold lines represent the flow of mechanical power. Solid lines represent the flow of hydraulic fluid. One solid line may represent multiple fluid circuits. Dotted lines represent control signals. Power is provided by engine 10 which drives the impeller of torque converter 12. Torque converter 12 transmits torque from an impeller to a turbine whenever the impeller rotates faster than the turbine. This is beneficial when the vehicle must accelerate from a stationary condition. To transmit torque, torque converter 12 must be filled with fluid. Torque converter 12 may also include a bypass clutch that, when engaged, transmits power from the impeller to the turbine without requiring a speed difference. The bypass clutch may be engaged by providing pressurized fluid. The fluid for these functions is provided by valve body 14 via fluid circuits 16. The turbine of torque converter 12 is fixed to the input shaft of gearbox 18. Gearbox 18 establishes various speed ratios based on current driving conditions. At low vehicle speeds and high torque demands, gearbox 18 multiplies the torque and reduces the speed. For cruising, gearbox 18 multiplies the speed such that the engine can operate at a low speed that is quiet and efficient. The gearbox speed ratio may be established by providing pressurized fluid to a subset of clutches via fluid circuits 20. Fluid may flow in either direction through circuits 16 and 20. Additionally, fluid flows at relatively low pressure through lubrication circuit 22 to gearbox 18 and then returns to primary sump 24. Fluid return flow path 26 represents the interior of the transmission housing. Primary sump 24 is located at the lowest point in the housing such that gravity causes the fluid to return to the sump.

Pressurized fluid is provided by pump 28, which draws fluid from primary sump 24 and transmits the fluid to valve body 14 via line pressure circuit 30. The power required to pressurize the fluid comes from engine 10. Whenever the pressure in line pressure circuit 30 exceeds a desired value, regulator valve 32 diverts some flow to auxiliary sump 34 via circuit 36 to relieve the excess pressure. Valve body may also exhaust excess fluid to auxiliary sump 34 via circuit 38. Auxiliary sump 34 is located higher than primary sump 24 and is located such that the rotating components of gearbox 18 do not move through any fluid that may be in auxiliary sump 34. Storing fluid in auxiliary sump 34 reduces the volume of fluid in primary sump 24. Ideally, the volume of fluid in auxiliary sump 34 is managed such that sufficient fluid remains in primary sump 24 yet the fluid level in primary sump 24 is lower than the lowest rotating components. To increase the volume of oil in primary sump 24, oil control valve 40 opens to permit flow through circuits 42 and 44. To decrease the volume of oil in primary sump 24, oil control valve 40 closes such that fluid pumped out of primary sump 24 by pump 28 builds up in auxiliary sump 34. When the volume of fluid in auxiliary sump 34 exceeds the sump capacity, it overflows and returns to primary sump 24 via the housing.

An oil control valve, like other types of valves, may be either passively controlled or actively controlled. When an actively controlled valve is utilized, a controller must determine the appropriate state of the valve based on sensors and then command the valve to open or close accordingly. For example, an actively controlled valve may be actuated by a solenoid that exerts a force in response to an electrical current regulated by the controller. In addition to the cost of the solenoid itself, active control increases costs because the controller must include a driver circuit to regulate the electrical current. A passively controlled valve, on the other hand, changes state from open to closed and from closed to open without a command from a controller.

The state of oil control valve 40 depends upon temperature control signal 46 and engine operation control signal 48. Temperature control signal 46 indicates a representative temperature of the fluid. In FIG. 1, temperature control signal 46 is implemented by routing circuit 36 through oil control valve 40. Other circuits could be selected for this purpose as long as the temperature of fluid in the circuit is representative. Circuits that are segregated as the fluid changes temperature are less appropriate for this purpose. Also, circuits that may be evacuated some of the time should be avoided. Engine operation control signal 48 is implemented by exposing oil control valve 40 to line pressure circuit 30. When the engine is not running, the pump does not rotate and the pressure in circuit 30 rapidly falls to near zero. When the engine is running, the pressure in circuit 30 is above a minimum line pressure threshold.

Figure 2:
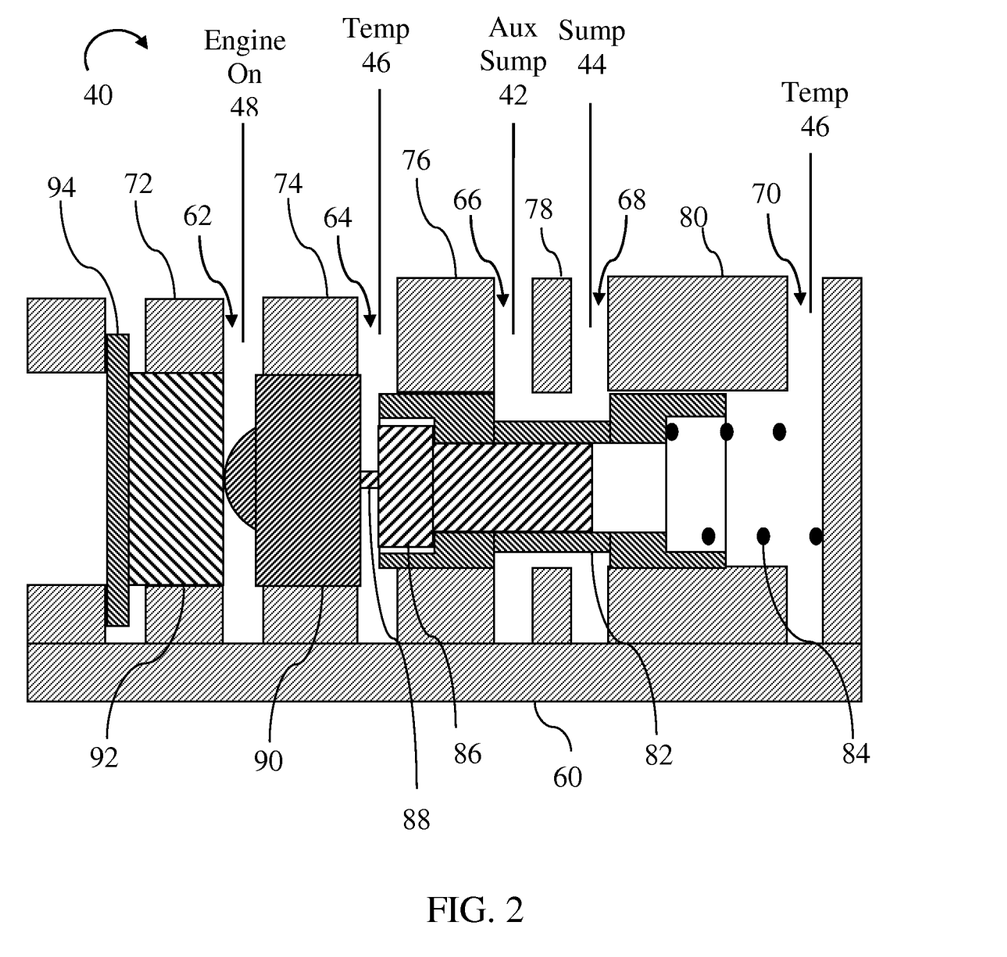
FIG. 2 is a cross sectional view of an oil control valve when fluid is colder and an engine is off.

FIG. 2 shows a cross section of oil control valve 40 when the engine is not running and the transmission fluid is cold. Valve bore 60 defines a number of ports 62, 64, 66, 68, and 70 separated by a number of lands 72, 74, 76, 78, and 80. Spool 82 slides axially between lands 76, 78, and 80. The diameter of spool 82 is less in a central section than near the ends. Spring 84 pushes spool 82 toward the left. Wax motor 86 is inserted into spool 82. Pin 88 emerges from wax motor 86 by a distance that depends upon the phase of wax. When the wax is in a solid state, as shown in FIG. 2, pin 88 extends a small distance. When the wax is heated, it changes to a liquid state and pushes pin 88 out by a greater distance. Spool 90, which has a larger diameter than spool 82, slides axially under land 74. Plug 92 is inserted under land 72 and held in place by plate 94.

Port 62 is connected to line pressure circuit 30 which provides the engine operation control signal 48. Since this signal would be generated regardless of whether the hydraulic circuit has an oil control valve, no additional solenoids are required. As shown in FIG. 2, the engine is off so this circuit is not pressurized. Consequently, pin 88 pushes spool 90 to the left against plug 92. Ports 64 and 70 are both connected to the regulator valve pressure relief circuit 36 which provides temperature control signal 46. Heat transfer occurs between the fluid and wax motor 86 such that the temperature of the wax closely follows the temperature of the fluid. Since this circuit acts on both ends of spool 82 and the ends have nearly identical areas, the net force imposed is negligible. Port 66 is connected to auxiliary sump 34 via circuit 42 and port 68 is connected to the primary sump 24 via circuit 44. In the position shown in FIG. 2, the reduced diameter section of spool 82 is centered under land 78 providing a flow passage from port 66 to port 68. Gravity forces fluid to flow from auxiliary sump 34 through oil control valve 40 to primary sump 24.

Figure 3:
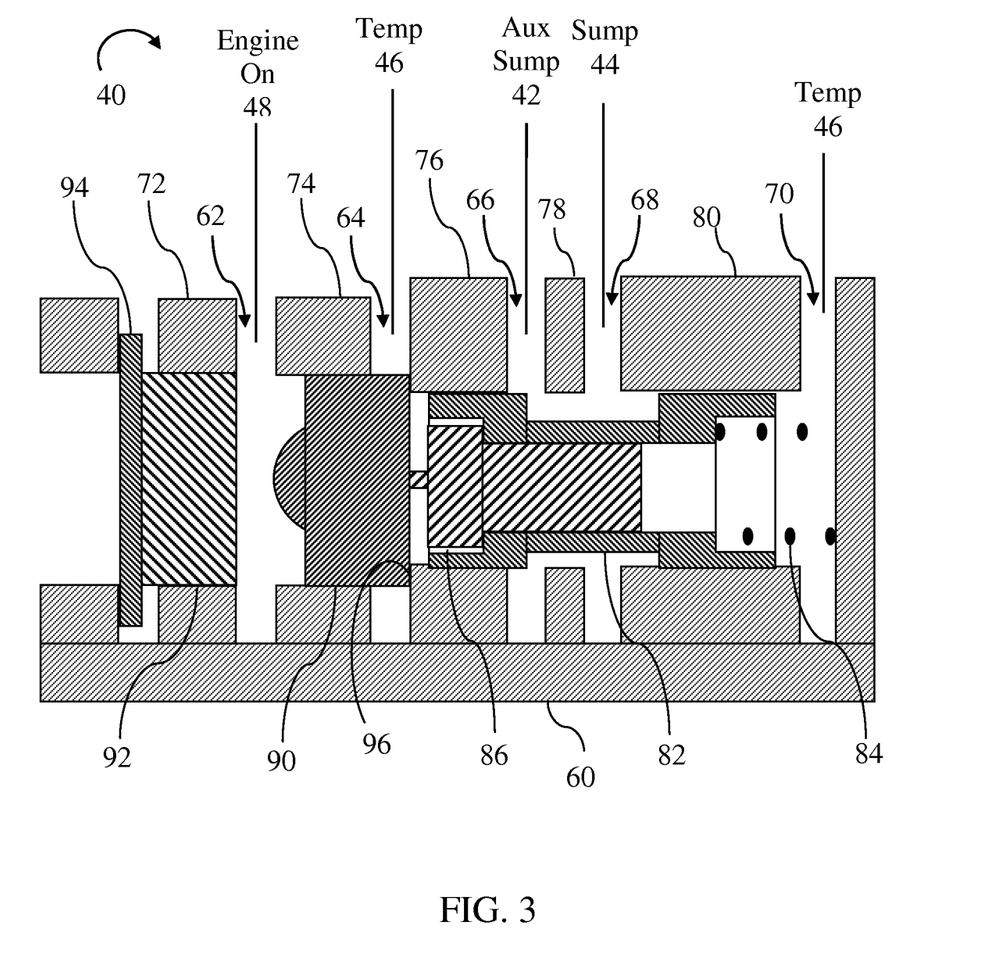

FIG. 3 shows a cross section of oil control valve 40 when the engine is running and the transmission fluid is cold. When the engine is on, line pressure forces spool 90 to the right. Spool 90 forces spool 82 to the right compressing spring 84. Movement to the right stops when spool 90 encounters shoulder 96. In the position shown in FIG. 3, fluid may still flow from port 66 to port 68 permitting auxiliary sump 34 to drain into primary sump 24. Since the oil is still cold, this makes the entire volume of oil available ensuring adequate oil even if the oil drains back slowly from gearbox 18.

Figure 4:
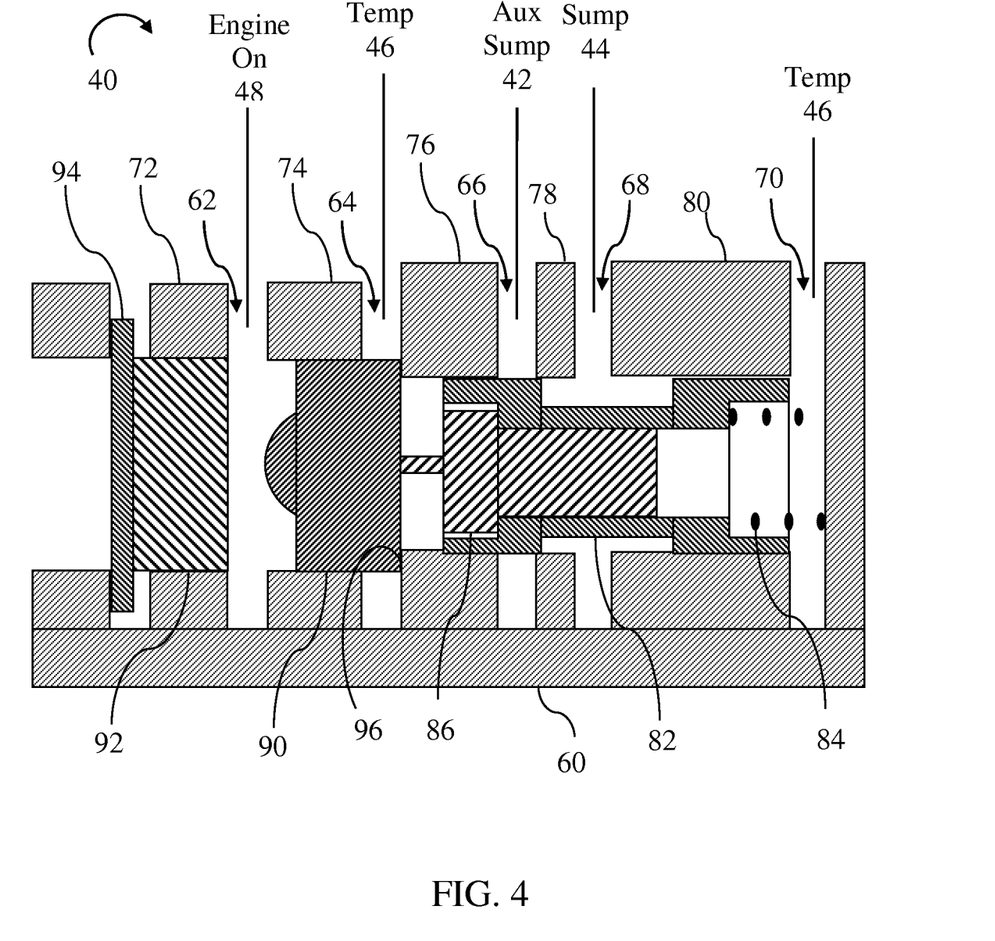
Figure 5:
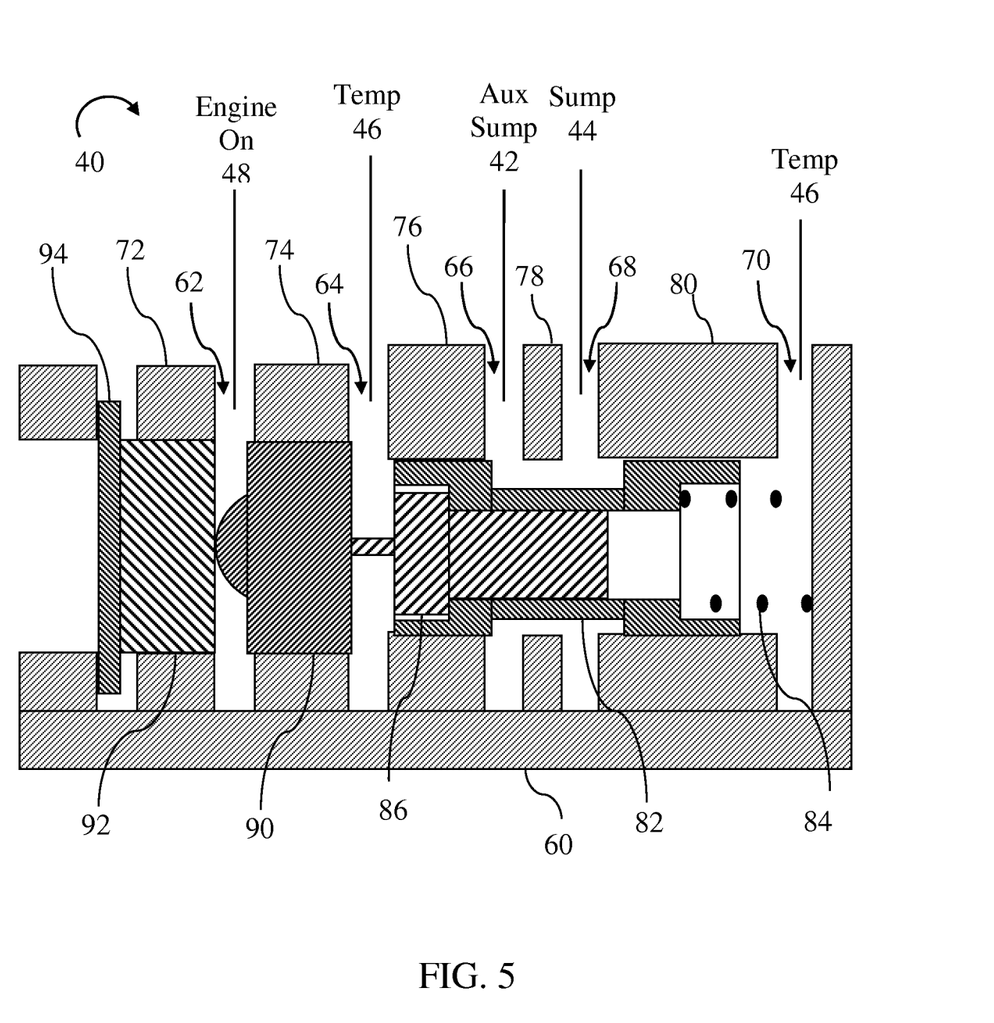
FIG. 5 is a cross sectional view of an oil control valve when fluid is at moderate temperature and an engine is off.

FIGS. 4 and 5 show oil control valve 40 at an intermediate temperature when the engine is on and when the engine is off, respectively. At this temperature, flow is blocked when the engine is on as shown in FIG. 4 and flow is allowed when the engine is off as shown in FIG. 5. This behavior is desired during final test of the transmission. After the transmission is assembled, it is placed on a test stand which performs a variety of test to ensure that all features are functioning properly. For example, the test stand would command various shifts to ensure that the speed ratio changed as commanded. To test that the oil control valve is functioning properly, the test much be of sufficient duration to heat the fluid enough to that the oil begins accumulating in the auxiliary sump. If the temperature at which that occurs is too high, then final test requires a long time. After the test, it is desirable to verify that the oil level is appropriate. Oil control valve 40 allows all of the oil to immediately drain to the primary sump following final test. If the oil control valve did not react to an engine running signal, it would be necessary to wait for the oil to cool down before verifying the oil level in the primary sump.

Figure 6:
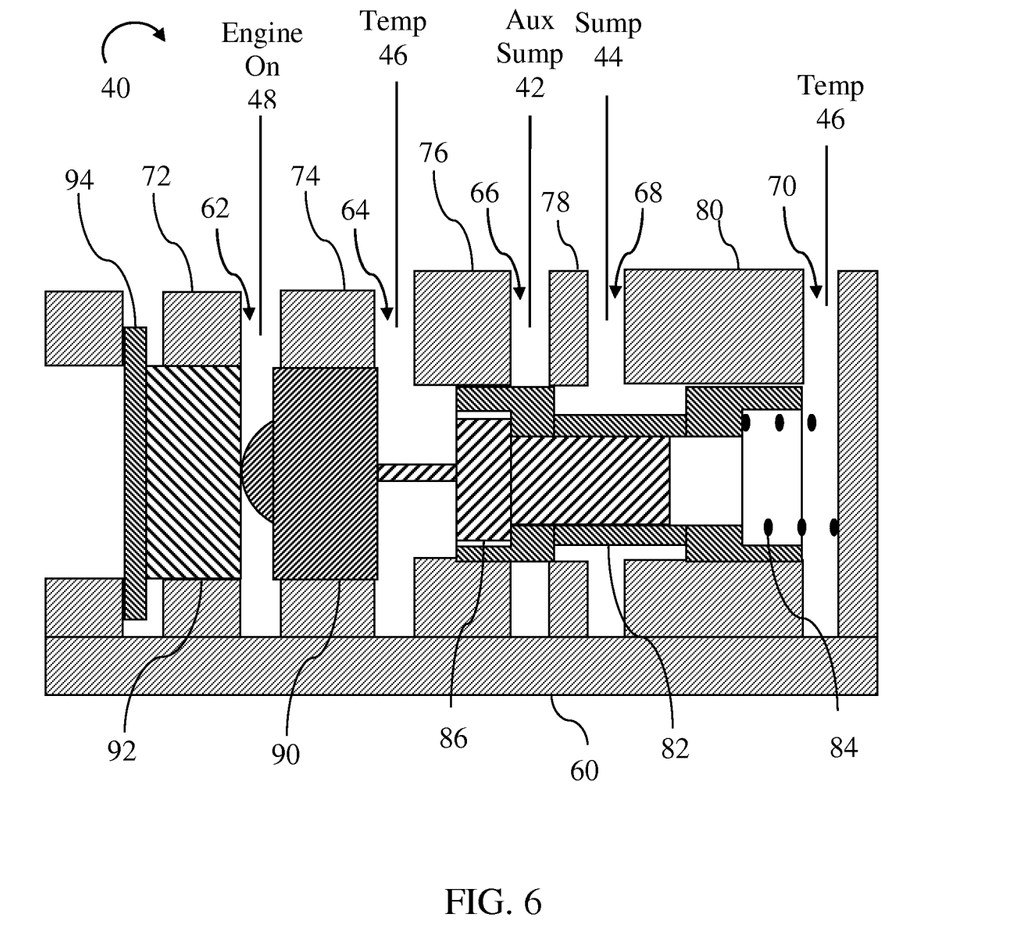
FIG. 6 is a cross sectional view of an oil control valve when fluid is at normal operating temperature and an engine is off.
Figure 7:
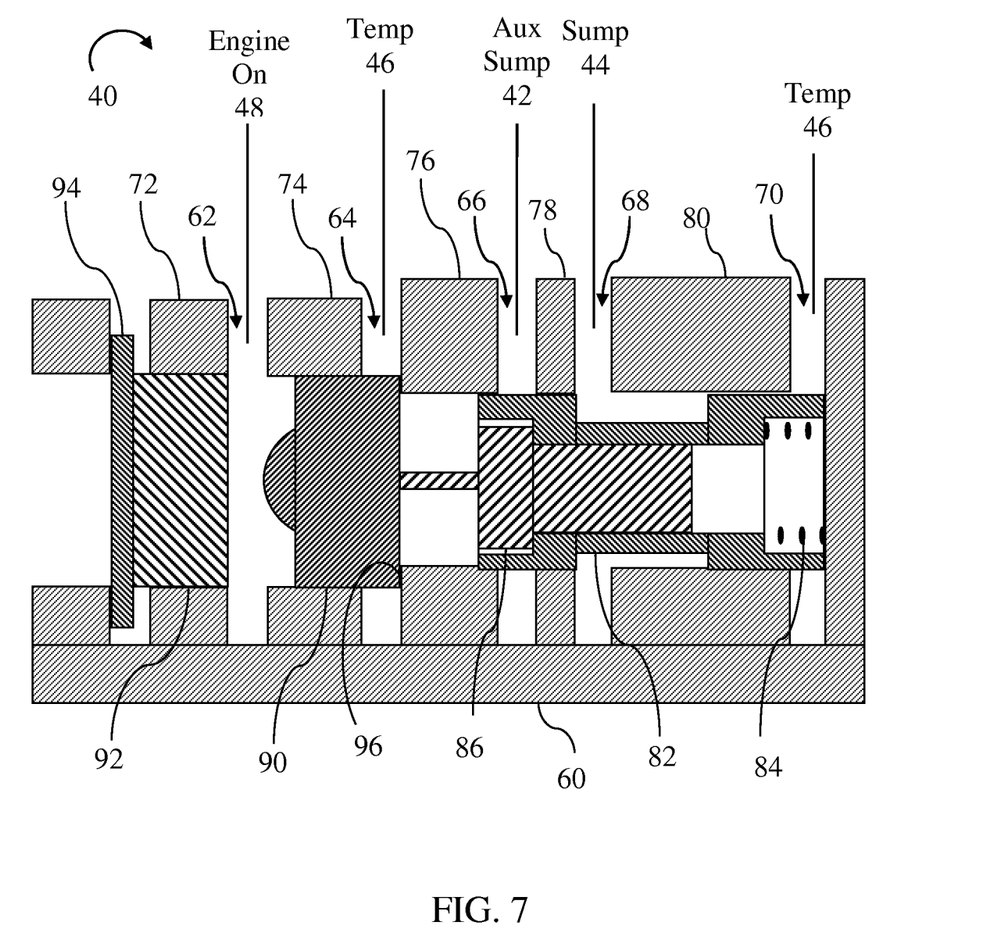

FIGS. 6 and 7 show oil control valve 40 at normal operating temperature when the engine is off and when the engine is on, respectively. At this temperature, flow is blocked independent of whether or not the engine is running. This behavior is desirable because some vehicle are programmed to reduce fuel consumption by stopping the engine while waiting at a traffic light and restarting the engine automatically when the driver releases the brake pedal. If the fluid drained from the auxiliary sump to the primary sump while the engine was off, then the transmission parasitic drag would be higher when the engine restarted.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hydraulic control system for a transmission comprising:
   a primary sump;
   an auxiliary sump; and
   an oil control valve configured to automatically restrict flow of fluid from the auxiliary sump to the primary sump, without a command from an external controller, in response to a temperature of the fluid exceeding a temperature threshold and configured to vary the temperature threshold based on whether an engine is running.

2. The hydraulic control system of claim 1 wherein the auxiliary sump and the primary sump are arranged such that gravity causes fluid to flow from the auxiliary sump to the primary sump when not restricted by the oil control valve.

3. The hydraulic control system of claim 1 further comprising a pump driven by the engine and configured to draw fluid from the primary sump and provide the fluid to a valve body at a line pressure, wherein the oil control valve senses whether the engine is running based on the line pressure.

4. The hydraulic control system of claim 3 wherein the valve body is configured to vent fluid to the auxiliary sump.

5. The hydraulic control system of claim 3 wherein the valve body is configured to provide lubrication fluid to a gearbox arranged relative to the primary sump such that gravity causes the lubrication fluid to drain back from the gearbox into the primary sump.

6. The hydraulic control system of claim 3 wherein the valve body is configured to provide pressurized fluid to various subsets of a plurality of clutches to establish various gearbox ratios.

7. The hydraulic control system of claim 3 further comprising a regulator valve configured to divert fluid from an outlet of the pump to the auxiliary sump to limit the line pressure.

8. The hydraulic control system of claim 3 wherein the oil control valve comprises:
   a housing defining a first port connected to line pressure, a second port connected to the auxiliary sump, a third port connected to the primary sump, and a fourth port;
   a first spool supported to slide within the housing in response to line pressure;
   a second spool supported to slide within the housing and biased toward the first spool by a spring, the second spool configured to permit flow between the second and third ports in a first position towards the first spool and to block flow between the second and third ports in a second position away from the first spool; and
   a wax motor configured to separate the first and second spools by a distance that is a function of a temperature of fluid in the fourth port.

9. The hydraulic control system of claim 8 wherein the housing is configured to restrict movement of the first spool towards the second spool.

10. The hydraulic control system of claim 9 wherein the first spool has a diameter greater than an outer diameter of the second spool.

11. An oil control valve comprising:
    a housing defining first, second, third, and fourth ports;
    a first spool supported to slide within the housing in response to fluid pressure in the first port;
    a second spool supported to slide within the housing and biased toward the first spool by a spring, the second spool configured to permit flow between the second and third ports in a first position towards the first spool and to block flow between the second and third ports in a second position away from the first spool; and
    a wax motor configured to separate the first and second spools by a distance that is a function of a temperature of fluid in the fourth port.

12. The oil control valve of claim 11 wherein the housing is configured to restrict movement of the first spool towards the second spool.

13. The oil control valve of claim 11 wherein the second port is defined by first and second lands, the first and second land having a diameter substantially equal to an outer diameter of the second spool such that the second port is blocked when the second spool is contacting both the first and second lands.

14. The oil control valve of claim 13 wherein the third port is defined by the second land and a third land and wherein the second spool has an annulus with a diameter less than the outer diameter to fluidly connect the second port to the third port when the annulus overlaps the second land.

15. The oil control valve of claim 14 wherein the third land has a diameter substantially equal to the outer diameter.

16. The oil control valve of claim 13 wherein the first spool has an outer diameter greater than the outer diameter of the second spool.

17. The oil control valve of claim 11 wherein the fourth port is not fluidly connected to either the second or the third ports.

18. A valve comprising:
    first and second sliding spools, the first spool biased toward the second spool by fluid pressure in a first port, the second spool biased toward the first spool by a spring, the second spool configured to alternately block a second port or to fluidly connect the second port to a third port based on axial position; and
    a wax motor, thermally connected to a fourth port, separating the first and second spools.

19. The valve of claim 18 further comprising a housing configured to restrict movement of the first spool towards the second spool.

20. The valve of claim 19 wherein the first spool has an outer diameter greater than an outer diameter of the second spool.

21. The valve of claim 18 wherein the fourth port is not fluidly connected to either the second or the third ports.

\* \* \* \* \*